US012289736B2

(12) United States Patent
Li et al.

(10) Patent No.: US 12,289,736 B2
(45) Date of Patent: Apr. 29, 2025

(54) DEVICES AND METHODS FOR CROSS-SLOT SCHEDULING ADAPTION

(71) Applicant: Panasonic Intellectual Property Corporation of America, Torrance, CA (US)

(72) Inventors: Hongchao Li, Langen (DE); Quan Kuang, Langen (DE); Ming-Hung Tao, Frankfurt am Main (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 378 days.

(21) Appl. No.: 17/705,161

(22) Filed: Mar. 25, 2022

(65) Prior Publication Data

US 2022/0217758 A1     Jul. 7, 2022

Related U.S. Application Data

(63) Continuation of application No. PCT/EP2020/077054, filed on Sep. 28, 2020.

(30) Foreign Application Priority Data

Oct. 4, 2019   (EP) .................................... 19201513

(51) Int. Cl.
*H04W 72/04*    (2023.01)
*H04W 72/23*    (2023.01)

(52) U.S. Cl.
CPC .................................. *H04W 72/23* (2023.01)

(58) Field of Classification Search
None
See application file for complete search history.

(56) References Cited

U.S. PATENT DOCUMENTS

| 2018/0279356 | A1  | 9/2018 | Feng |
| 2019/0159213 | A1  | 5/2019 | Baldemair et al. |
| 2023/0309105 | A1* | 9/2023 | Yi ..................... H04W 72/0446 |

FOREIGN PATENT DOCUMENTS

RU        2658340 C1    6/2018

OTHER PUBLICATIONS

3GPP, "3rd Generation Partnership Project; Technical Specification Group Radio Access Network; NR; Multiplexing and channel coding (Release 15)," 3GPP TS 38.212 V15.6.0, Jun. 2019 (101 pages).
3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019 (99 pages).

(Continued)

*Primary Examiner* — Willie J Daniel, Jr.
(74) *Attorney, Agent, or Firm* — Seed IP Law Group LLP

(57) ABSTRACT

The present disclosure provides a transceiver device, comprising a transceiver, which in operation, receives data after receiving a scheduling grant; and circuitry, which in operation, determines whether or not to apply a restriction to a time domain resource allocation, TDRA, table according to a minimum scheduling gap, wherein the determination includes a determination of whether or not a common TDRA table is configured.

18 Claims, 5 Drawing Sheets

(56) References Cited

OTHER PUBLICATIONS

3GPP, "3rd Generation Partnership Project; Technical Specification Group Radio Access Network; NR; Physical channels and modulation (Release 15)," 3GPP TS 38.211 V15.0.0, Dec. 2017 (74 pages).
3GPP, "3rd Generation Partnership Project; Technical Specification Group Radio Access Network; NR; Physical channels and modulation (Release 15)," 3GPP TS 38.211 V15.6.0, Jun. 2019 (97 pages).
3GPP, "3rd Generation Partnership Project; Technical Specification Group Radio Access Network; Study on new radio access technology: Radio access architecture and interfaces (Release 14)," 3GPP TR 38.801 V14.0.0, Mar. 2017 (91 pages).
3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018 (39 pages).
3GPP, "3rd Generation Partnership Project; Technical Specification Group Services and System Aspects; System Architecture for the 5G System; Stage 2 (Release 16)," 3GPP TS 23.501 V16.1.0, Jun. 2019 (368 pages).
Extended European Search Report, mailed Mar. 16, 2020, for European Application No. 19201513.9 (12 pages).
International Search Report, mailed Nov. 10, 2020, for International Application No. PCT/EP2020/077054 (3 pages).
Qualcomm Incorporated, "Cross-slot scheduling power saving techniques," R1-1909276, Agenda Item: 7.2.9.2, 3GPP TSG-RAN WG1 #98, Prague, Czech Republic, Aug. 26-30, 2019 (16 pages).
Qualcomm Incorporated, "UE Adaptation to the Traffic and UE Power Consumption Characteristics," R1-1900911, Agenda Item: 7.2.9.2.1, 3GPP TSG-RAN WG1 Ad-Hoc Meeting 1901, Taipei, Taiwan, Jan. 21-25, 2019 (24 pages).
Communication pursuant to Article 94(3) EPC, dated Apr. 25, 2024, for corresponding European Patent Application No. 20776180.0, 15 pages.
Qualcomm Incorporated, "Potential Techniques for UE Power Saving," R1-1903016, Agenda Item: 7.2.9.2, 3GPP TSG-RAN WG1 #96, Athens, Greece, Feb. 25-Mar. 1, 2019 (33 pages).
Indian Examination Report dated Jan. 15, 2024, for the corresponding Indian Patent Application No. 202247018738, 6 pages.
OPPO, "UE Adaptation to the Traffic and UE Power Consumption," R1-1902745, Agenda Item: 7.2.9.2, 3GPP TSG RAN WG1 #96, Athens, Greece, Feb. 25-Mar. 1, 2019, 14 pages.
Russian Office Action dated Feb. 1, 2024, for the corresponding Russian Patent Application No. 2022102450/07(005262), 24 pages. (With English Machine Translation).
Japanese Notice of Reasons for Rejection dated Aug. 20, 2024, for the corresponding Japanese Patent Application No. 2022-520589, 16 pages. (With English Translation).
LG Electronics, "Discussion on cross-slot scheduling for power saving," R1-1904636, Agenda Item: 7.2.9.2, 3GPP TSG RAN WG1 Meeting #96bis, Xi'an, China, Apr. 8-12, 2019, 4 pages.

* cited by examiner

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 1 | 3 | 8 |
| 4 | 2 | Type A | 1 | 2 | 7 |
|   | 3 | Type A | 1 | 3 | 6 |
| 5 | 2 | Type A | 1 | 2 | 5 |
|   | 3 | Type A | 1 | 3 | 4 |
| 6 | 2 | Type B | 2 | 9 | 4 |
|   | 3 | Type B | 2 | 10 | 4 |
| 7 | 2 | Type B | 2 | 4 | 4 |
|   | 3 | Type B | 2 | 6 | 4 |
| 8 | 2,3 | Type B | 2 | 5 | 7 |
| 9 | 2,3 | Type B | 3 | 5 | 2 |
| 10 | 2,3 | Type B | 3 | 9 | 2 |
| 11 | 2,3 | Type B | 3 | 12 | 2 |
| 12 | 2,3 | Type A | 3 | 1 | 13 |
| 13 | 2,3 | Type A | 4 | 1 | 6 |
| 14 | 2,3 | Type A | 4 | 2 | 4 |
| 15 | 2,3 | Type B | 4 | 4 | 7 |
| 16 | 2,3 | Type B | 4 | 8 | 4 |

$K_0$: Gap between PDCCH and PDSCH in terms of slots
S: Starting symbol
L: PDSCH length in terms of symbols

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 1 | 3 | 8 |
| 4 | 2 | Type A | 1 | 2 | 7 |
|   | 3 | Type A | 1 | 3 | 6 |
| 5 | 2 | Type A | 1 | 2 | 5 |
|   | 3 | Type A | 1 | 3 | 4 |
| 6 | 2 | Type B | 2 | 9 | 4 |
|   | 3 | Type B | 2 | 10 | 4 |
| 7 | 2 | Type B | 2 | 4 | 4 |
|   | 3 | Type B | 2 | 6 | 4 |
| 8 | 2,3 | Type B | 2 | 5 | 7 |
| 9 | 2,3 | Type B | 3 | 5 | 2 |
| 10 | 2,3 | Type B | 3 | 9 | 2 |
| 11 | 2,3 | Type B | 3 | 12 | 2 |
| 12 | 2,3 | Type A | 3 | 1 | 13 |
| 13 | 2,3 | Type A | 4 | 1 | 6 |
| 14 | 2,3 | Type A | 4 | 2 | 4 |
| 15 | 2,3 | Type B | 4 | 4 | 7 |
| 16 | 2,3 | Type B | 4 | 8 | 4 |

Gap between PDCCH and PDSCH in terms of slots → $K_0$
Starting symbol → S
PDSCH length in terms of symbols → L ——— If K0_min is 2, #6 - #16 are valid
— — — If K0_min is 3, #9 - #16 are valid

Fig. 9

DEVICES AND METHODS FOR CROSS-SLOT SCHEDULING ADAPTION

BACKGROUND

Technical Field

The present disclosure relates to transmission and reception of signals in a communication system. In particular, the present disclosure relates to methods and apparatuses for such transmission and reception.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing improved procedures for facilitating to save UE power, including procedures involving cross-slot scheduling.

In an embodiment, the techniques disclosed herein feature a transceiver device comprising a transceiver, which in operation, receives data after receiving a scheduling grant; and circuitry, which in operation, determines whether or not to apply a restriction to a time domain resource allocation, TDRA, table according to a minimum scheduling gap, wherein the determination includes a determination of whether or not a common TDRA table is configured.

In an embodiment, the techniques disclosed herein feature a transceiver device comprising a transceiver, which in operation transmits data after receiving a scheduling grant; and circuitry, which in operation, determines whether or not to apply a restriction to a time domain resource allocation, TDRA, table according to a minimum scheduling gap, wherein the TDRA table comprises a plurality of entries, each entry specifying a time domain resource allocation including a scheduling gap indicator indicating a gap between reception of the scheduling grant and scheduled resources, and the determination includes comparing the minimum scheduling gap and the scheduling gaps included in the TDRA table.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings:

FIG. 9 is a schematic drawing illustrating exemplary restrictions of an exemplary TDRA table according to minimum scheduling gaps.

DETAILED DESCRIPTION

5G NR system architecture and protocol stacks 3GPP has been working at the next release for the 5th generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
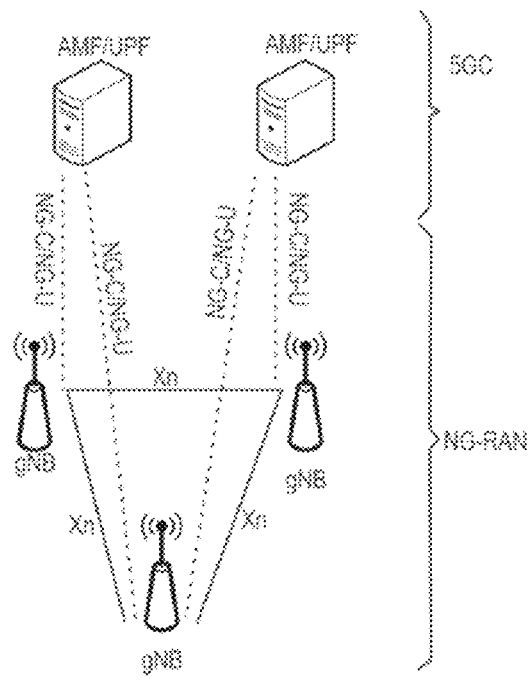
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

Various different deployment scenarios can be supported (see, e.g., 3GPP TR 38.801 v14.0.0). For instance, a non-centralized deployment scenario (see, e.g., section 5.2 of TR 38.801; a centralized deployment is illustrated in section 5.4) is presented therein, where base stations supporting the 5G NR can be deployed. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 2:
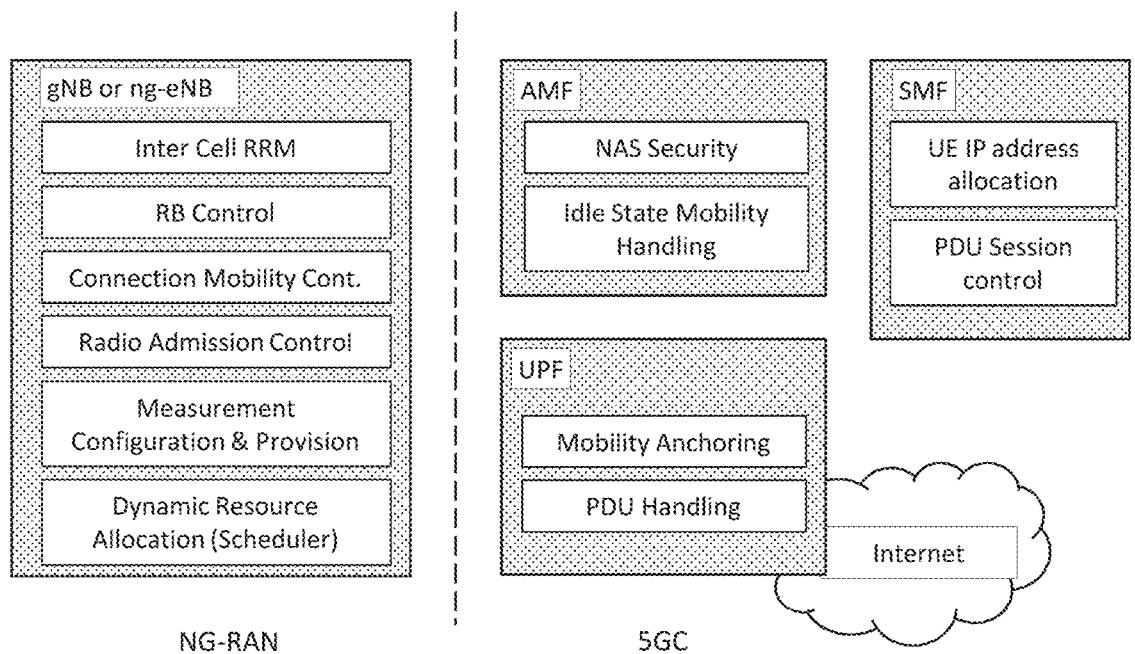
FIG. 2 is a schematic drawing which shows functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or OAM);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity; and
Tight interworking between NR and E-UTRA.

The Access and Mobility Management Function (AMF) hosts the following main functions:

Non-Access Stratum, NAS, signalling termination;
NAS signalling security;
Access Stratum, AS, Security control;
Inter Core Network, CN, node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing; and
Session Management Function, SMF, selection.

Furthermore, the User Plane Function, UPF, hosts the following main functions:
  Anchor point for Intra-/Inter-RAT mobility (when applicable);
  External PDU session point of interconnect to Data Network;
  Packet routing & forwarding;
  Packet inspection and User plane part of Policy rule enforcement;
  Traffic usage reporting;
  Uplink classifier to support routing traffic flows to a data network;
  Branching point to support multi-homed PDU session;
  QoS handling for user plane, e.g., packet filtering, gating, UL/DL rate enforcement;
  Uplink Traffic verification (SDF to QoS flow mapping); and
  Downlink packet buffering and downlink data notification triggering.

Finally, the Session Management function, SMF, hosts the following main functions:
  Session Management;
  UE IP address allocation and management;
  Selection and control of UP function;
  Configures traffic steering at User Plane Function, UPF, to route traffic to proper destination;
  Control part of policy enforcement and QoS; and
  Downlink Data Notification.

RRC Connection Setup and Reconfiguration Procedures

Figure 3:
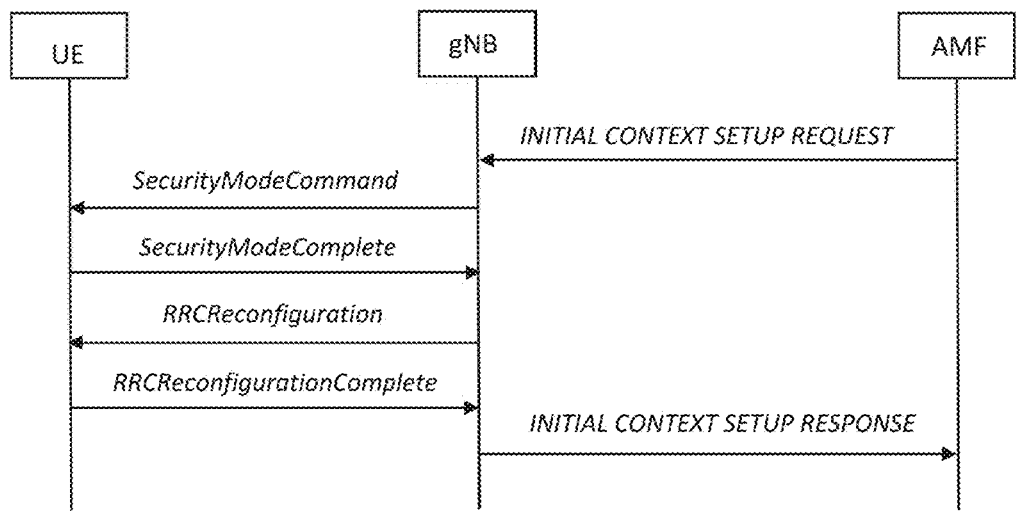
FIG. 3 is a sequence diagram for RRC connection setup/reconfiguration procedures.

FIG. 3 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and beyond

Figure 4:
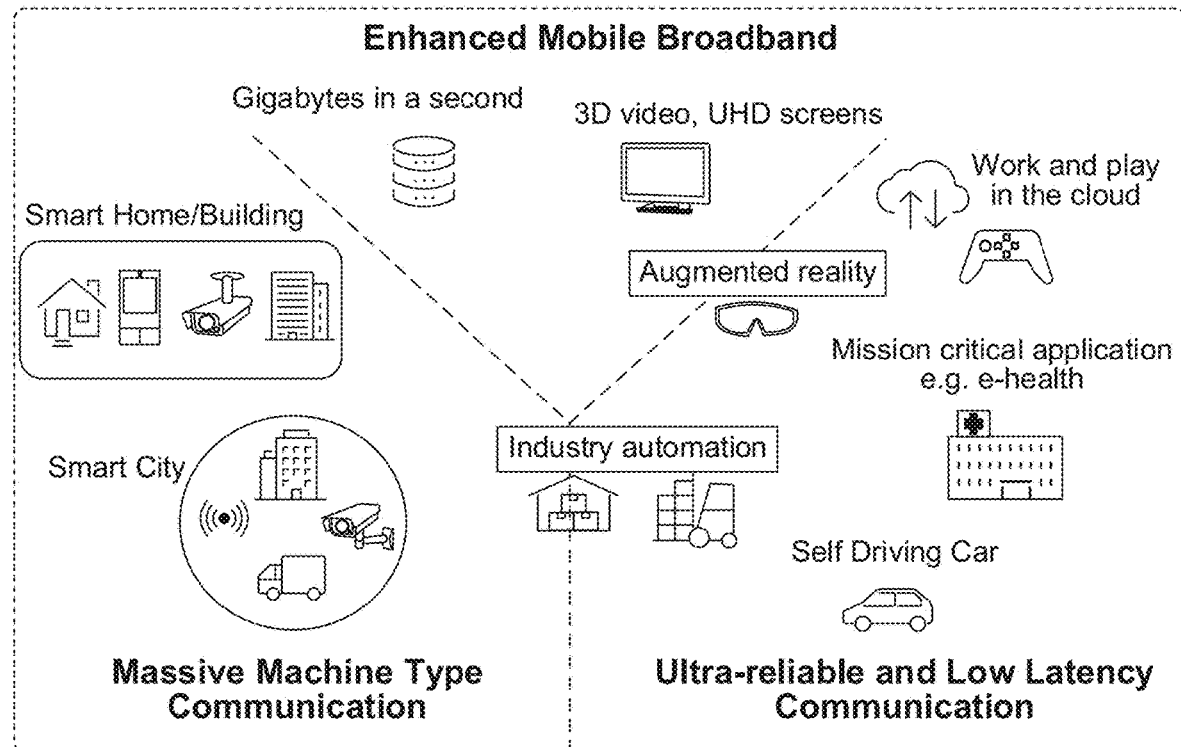
FIG. 4 is a schematic drawing showing usage scenarios of Enhanced mobile broadband, Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E−5 for a packet size of 32 bytes with a user plane latency of 1 ms.

From RAN1 perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E−5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLCC, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figures 5, 6:
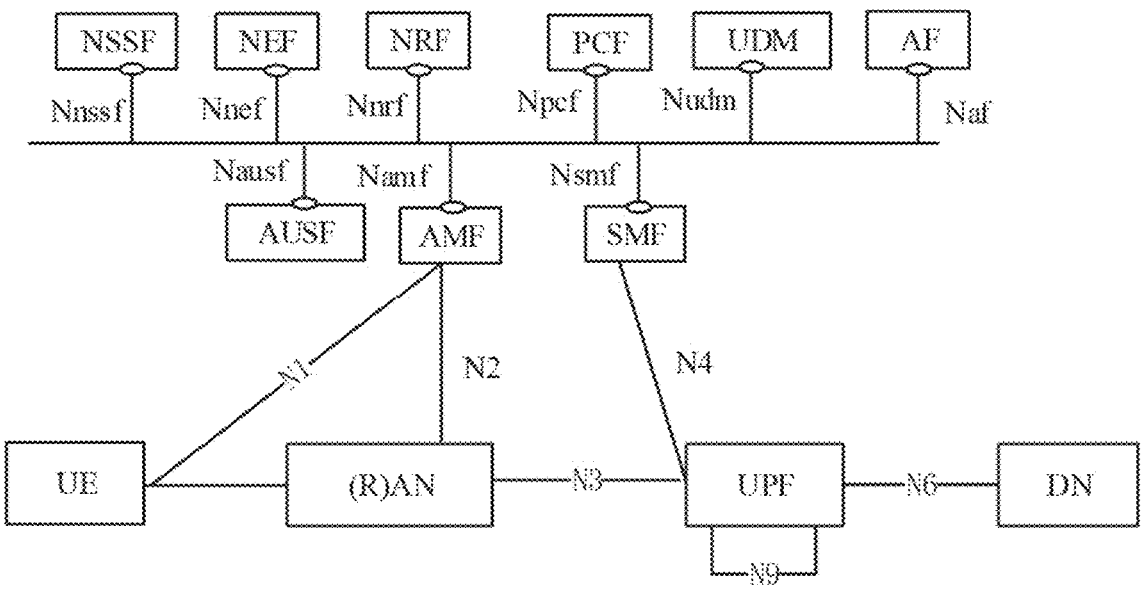
FIG. 5 is a block diagram which shows an exemplary 5G system architecture for a non-roaming scenario.
FIG. 6 is a schematic drawing illustrating an exemplary TDRA table.

FIG. 5 illustrates a 5G NR non-roaming reference architecture (see TS 23.501 v16.1.0, section 4.23). An Application Function (AF), e.g., an external application server hosting 5G services exemplary described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

A terminal is referred to in LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

Downlink Control Channel Monitoring, PDCCH, DCI

Many of the functions operated by the UE involve the monitoring of a downlink control channel (e.g., the PDCCH, see 3GP TS 38.300 v15.6.0, section 5.2.3) to receive, e.g., particular control information or data destined to the UE.

A non-exhaustive list of these functions is given in the following:
  a paging message monitoring function,
  a system information acquisition function,
  signalling monitoring operation for a Discontinued Reception, DRX, function,
  inactivity monitoring operation for a Discontinued Reception, DRX, function,
  random access response reception for a random access function, and
  reordering function of a Packet Data Convergence Protocol, PDCP, layer.

As mentioned above, the PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v15.6.0 section 7.3.1).

Said DCI formats represent predetermined formats in which respective information is formed and transmitted. In particular, DCI formats 0_1 and 1_1 are used for scheduling PUSCH and PDSCH, respectively, in one cell.

Power-Saving Enhancements

It is critical to study UE power consumption to ensure that UE power efficiency for 5G NR UEs can be better than that of LTE, and that techniques and designs for improvements are identified and adopted. 3GPP is currently studying how to save UE power taking into considerations latency and performance in the NR system. For instance, a power saving signal/channel/procedure is used for triggering adaptation of the UE power consumption characteristic. This may involve reducing UE power consumption relating to the UE paging procedure.

Cross-Slot Scheduling

Cross-slot scheduling has been envisaged among 3GPP RAN1 study items (SI) and work items (WI) as it may facilitate power saving. One of the main objectives is to specify procedures of cross-slot scheduling so as to enable communication devices to take advantage of power saving techniques. The present disclosure provides for more efficient cross-scheduling framework facilitating option of power saving for some communication devices.

For the purpose of scheduling, a communication device such as user equipment (UE) may be notified of resources on which it (i.e., the UE itself) is to transmit/receive data in the Downlink Control Information (DCI), which are received by the UE in the Physical Downlink Control Channel (PDCCH). For instance, in case the UE is to receive data, the DCI may include a corresponding indication of resources in the Physical Downlink Shared Channel (PDSCH), and/or, in case the UE is to transmit data, the DCI may include a corresponding indication of resources in the Physical Uplink Shared Channel (PUSCH). Such indications may indicate the position of the resources in frequency and/or time domain, and or may indicate the length in terms of symbols as described in more detail below. In addition thereto, the DCI may provide further transmission parameters such as modulation and coding scheme (MCS) beamforming/pre-coding or other Multiple-Output Multiple-Input (MIMO) parameters or the like. The PDCCH is transmitted from the transmitter in a network (access) node such as base station to a communication device. In order to receive PDCCH, a communication device typically has to monitor certain resources referred to as a search space or CORESET (control resource set). Monitoring means blindly decoding to find out whether or not here is control information directed to the monitoring communication device. This is achieved, for instance, by providing (by the scheduling node) a cyclic redundancy check for the control information scrambled with the identity of the communication device to which the control information is directed.

In LTE, the concept of a CORESET is not explicitly present. Instead, downlink control signaling in LTE uses the full carrier bandwidth. This is known as the control region in LTE. A more flexible structure is used in NR.

CORESET is a set of physical resources (i.e., a specific area on NR Downlink Resource Grid) and a set of parameters that is used to carry PDCCH/DCI. It is equivalent to LTE PDCCH area (the first 1,2,3,4 OFDM symbols in a subframe). But in LTE PDCCH region, the PDCCH always spread across the whole channel bandwidth, but NR CORESET region is localized to a specific region in frequency domain.

A CORESET can occur at any position within a slot and anywhere in the frequency range of the carrier. However, a device is not expected to handle CORESETs outside its active BWP.

The first CORESET, CORESET 0, is provided by the master information block (MIB) as part of the configuration of the initial BWP to be able to receive system information and additional configuration information from the network. After connection setup, a device can be configured with multiple, potentially overlapping CORESETs in addition to using RRC signaling.

The network may define common control region and UE specific control region. In NR, the number of CORESET is limited to 3 per BWP including both common and UE specific CORESET. The common CORESET is shared by multiple UEs in a cell, so accordingly the network takes care on alignment with all UEs for this configuration.

Each search space is a set of control channel elements at different aggregation levels and there is a mapping between CORESET and search space. A CORESET may have multiple search spaces, where the UE attempts for blind decoding.

As for instance specified in Release 15 (NR), the scheduling timing (e.g., for the scheduling of resources described above) may be indicated within the DCI by using a Time Domain Resource Allocation (TDRA) table. In particular, a UE may be notified of allocated resources by indicating one entry (typically a row of the table) of said TDRA table in the DCI, for instance, by signaling an entry (row) index. The term table is used herein as a logical term, as the TDRA entries may be summarized as a table in a standard specification. However, it is noted that the present disclosure is not limited to any particular physical storage organization and the TDRA table may be implemented in any manner as a set of entries associated with the respective entry indices.

FIG. 6 is a schematic drawing illustrating an exemplary TDRA table. The TDRA table comprises a column specifying a row index which labels an entry (row of the table) including values for each of the columns. In this exemplary TDRA table, there is a column specifying a dmrs-TypeA-Position, a column specifying a PDSCH mapping type, a column specifying a K0 value (i.e., a scheduling gap), a column specifying an S value, and/or a column specifying an L value. The DCI indication of a row of a TDRA table (one value of the row index) thus corresponds to an indication of a combination of specific values of dmrs-TypeA-Position, PDSCH mapping type, K0 value, S value, and/or L value.

In this example, the dmrs-TypeA-Position is a parameter relating to the position of the demodulation reference signal. This parameter is specified by another signaling parameter. Based on whether the parameter takes value of 2 or 3, the row index refers to a slightly different time domain resource allocation. The parameters dmrs-TypeA-Position and PDSCH mapping type are of no further importance for the present disclosure; details can be found in NR standard specifications. In general, the TDRA table may include more or less parameters as those shown with reference to FIG. 6. The actual resource allocation is provided by the parameters $K_0$, S, and L for this exemplary downlink TDRA table. In NR, there is a set of TDRA tables for downlink resource allocation and the TDRA table of FIG. 6 is one of them. Moreover, there is a set of TDRA tables for uplink resource allocation which differs from the downlink table set. In case of uplink TDRA tables, the tree parameters specifying resource allocation (resource grant) are K2, S, and L. It is noted that the present disclosure may be readily employed for NR including the tables as currently defined, but is not limited thereto. It may also be applied to sidelink; it may be applied to different tables or even to resource allocation organized (signaled) in a different way.

The K0 value indicated in the DCI by means of the TDRA table row index indicates a gap between the slot of the PDCCH and the slot of the PDSCH in terms of slots. Here, the slot of the PDCCH is the slot in which the DCI indicating the respective K0 is received, henceforth also denoted as scheduling slot or slot carrying scheduling information or slot carrying scheduling grant. Furthermore, the slot of the PDSCH may be the slot (or the first/starting slot) in which the scheduled resources are located, e.g., the slot in which data are to be transmitted/received. In other words, K0 may indicate the relative position (in time domain) of the slot including the resources scheduled for reception/transmission with respect to a reference slot, and this reference slot may be the slot of the DCI indicating said K0. More specifically, K0 may indicate the size of the gap or the relative position in terms/units of slots. It is noted that a particular value of K0, e.g., the value zero in the case of the table shown in FIG. 3, may indicate that there is no gap and that the resources on which data are to be transmitted/received are located in the same slot as the DCI indicating the K0. Moreover, this is only an example, and in general, the scheduling gap may be indicated including or not including the first slot (PDCCH) slot and/or the slot in which the allocated resource starts (first PDSCH slot, also referred to as resource slot or scheduled slot). In general, the scheduling gap (in NR denoted as K0 for downlink and K2 for uplink) specifies the gap (time interval) between the scheduling resource and scheduled resource.

The terms "slot" and "time slot" are in general used interchangeably in this disclosure. In general, slot refers to a time domain resource in this disclosure. In case of NR, the time interval corresponding to a slot depends on numerology, which is a combination of symbol duration, subcarrier spacing and cyclical prefix. A slot consists of a specified number of symbols which may be one or more. A specified number of slots forms a subframe, and a plurality of subframes may form a radio frame. The term "specified" refers to the fact that both UE and gNB have knowledge of it. This may be achieved by signaling such configuration beforehand, i.e., before starting the scheduling procedure or with the scheduling procedure, some parameters of the resources provided by the system may be also fixed and given by a standard.

It is further noted that the case of an UL grant in the DCI is similar to the above explained case of a DL grant. However, the scheduled resources are in the PUSCH (and not the PDSCH), and the number indicating the gap is usually denoted as K2 (and not K0). In the present disclosure, K will be used to refer to any one of K0, K2, or a K for other type of link such as sidelink.

Furthermore, the S value indicated in DCI may indicate the position of the starting symbol of the scheduled resources in the relevant slot (which is the slot in which the scheduled resources are to be received/transmitted, given by K0/K2). Finally, the L value indicated in DCI may indicate the length of the PDSCH/PUSCH in terms/units of symbols and/or the length of the scheduled resource in terms/units of symbols. Although in FIG. 3 all entries specify a K0 value of zero, in general a TDRA table includes entries with different (integer) values of K0. For instance, one entry of a TDRA table may correspond to a K0 value of 1, while another entry of the same TDRA table may correspond to a K0 value of 2. The possibility of a non-zero K value allows cross slot scheduling, which refers to the case in which a DCI scheduling resources and the corresponding resources scheduled in said DCI are located in different slots. In general, cross-slot scheduling may facilitate providing several advantages in terms of power saving.

For instance, cross-slot scheduling may save power by relaxing the PDCCH processing timeline, for instance, since a UE may not be required to decode PDCCH as fast as in the same-slot scheduling case (in which the DCI scheduling resources and the corresponding resources scheduled in said DCI are located in the same slots). Furthermore, cross-slot scheduling may allow late PDSCH buffering. Unlike for same-slot scheduling, in case of cross-slot scheduling, a UE may not have to buffer all the symbols after receiving PDCCH, until it decodes the PDCCH and realizes where the scheduled resources are actually located.

In particular, when a UE knows the minimum (scheduling) gap between PDCCH and scheduled PDSCH, i.e., knows the minimum K that may be indicated in a DCI/PDCCH, the UE may skip the PDSCH buffering at least in the current slot (e.g., the slot in which the PDCCH is received) and the next K−1 slots. Moreover, cross-slot scheduling potential may allow more micro-sleep periods in this time interval especially in case no PDCCH is to be scheduled until the scheduled resource is received.

Figure 7:
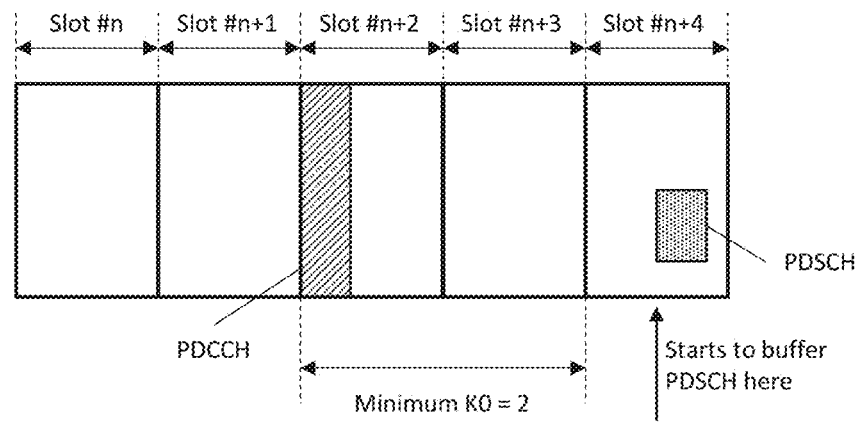
FIG. 7 is a schematic drawing illustrating cross-slot scheduling.

This is illustrated in FIG. 7, a schematic drawing illustrating cross-slot scheduling, which shows the case of a minimum K value of 2 (more precisely, K0=2 in the figure). A UE, if it has knowledge of minimum K, is neither required to monitor PDCCH during the rest of slot # n+2 and slot # n+3, nor required to perform measurements during these slots, nor required to buffer received data (PDSCH). The UE can choose to go to micro-sleep during the remaining part of slot # n+2 and/or slot slot # n+3 in order to save power. However, please note that not all UEs have to implement and/or employ power saving. Provision of K increases the flexibility and opportunity for power saving but does not prescribe it.

FIG. 7 is an example based on current NR specification. It illustrates a specific case, in which the PDCCH is transmitted in the entire first BWP, but the resources are only scheduled in a subset of physical resource blocks, PRBs, of the bandwidth part (BWP). It is noted that FIG. 7 may also apply to cases in which the BWP concept is not employed, i.e., the entire bandwidth is always allocable. A PRB refers to a resource unit with a predetermined number of subcarriers of certain numerology and certain number of symbols.

In the current Rel. 15 NR, each configured TDRA table is signalled within configuration relating to PDSCH on RRC layer (PDSCH-Config), which may be within a specific container pertaining to a Bandwidth Part ((BWP)-DownlinkDedicated). Therefore, if TDRA table is higher layer configured, the TDRA table may be BWP-specific. A communication device, e.g., UE, may use a default table or may apply the higher layer configured pdsch-TimeDomainAllocationList in either pdsch-ConfigCommon or pdsch-Config. However, this is only one possible detailed example of interaction between TDRA configuration and BWP concept of NR. The present invention does not presuppose employing BWP and is not limited to resource allocation using TDRA tables.

RRC (Radio Resource Control) signaling is used by the gNB (gNodeB, an exemplary name of the base station in NR corresponding to the eNodeB (enhanced NodeB) of LTE (Long Term Evolution)) to configure semi-statically or statically, parameters of a radio access bearer and other parameters in the communication device (UE). As defined in the section 4.4.5 of TS 38.211 V15.0.0 (2017-12), a bandwidth part (or carrier bandwidth part) is a contiguous set of physical resource blocks as defined in clause 4.4.4.3, selected from a contiguous subset of the common resource blocks defined in clause 4.4.4.2 for a given numerology on a given carrier. It is defined in the specification TS 38.211 V15.0.0 that a UE can be configured with up to four carrier bandwidth parts in the downlink with a single downlink carrier bandwidth part being active at a given time. The UE is not expected to receive PDSCH (Physical Downlink Shared Channel), PDCCH (Physical Downlink Control Channel), CSI-RS (Downlink Reference Signals for Estimation of Channel State Information), or TRS (Tracking Reference Signals for fine time and frequency tracking of channel) outside an active bandwidth part.

It is further defined in the specification that a UE can be configured with up to four carrier bandwidth parts in the uplink with a single uplink carrier bandwidth part being active at a given time. If a UE is configured with a supplementary uplink, the UE can in addition be configured with up to four carrier bandwidth parts in the supplementary uplink with a single supplementary uplink carrier bandwidth part being active at a given time. The UE shall not transmit PUSCH or PUCCH outside an active bandwidth part. A numerology is defined by subcarrier spacing and cyclic prefix (CP). A resource block is generally defined as 12 consecutive subcarriers in the frequency domain. Physical resource blocks (PRB) are numbered within a BWP, the PRB numbering is for the BWP starting from 0.

The size of a BWP can vary from a minimum of 1 PRB to the maximum size of system bandwidth. Currently, up to four BWPs can be configured by higher layer parameters for each DL (downlink) and UL (uplink), with a single active downlink and uplink BWP in a given TTI (transmission time interval). However, the disclosure is not limited to the case defined in TS 38.211 of a UE being configured with up to four bandwidth parts. The number of bandwidth parts may be greater than 4 in the uplink and/or downlink. For example, a UE may be configured with 8 BWPs.

TTI (Transmission Time Interval) determines the timing granularity for scheduling assignment. One TTI is the time interval in which given signals is mapped to the physical layer. The TTI length can vary from 14-symbols (slot-based scheduling) to up to 2-symbols (non-slot based scheduling). Downlink and uplink transmissions are specified to be organized into frames (10 ms duration) consisting of 10 subframes (1 ms duration). In slot-based transmission, a subframe, in return, is divided into slots, the number of slots being defined by the numerology/subcarrier spacing and the specified values range between 10 slots for a subcarrier spacing of 15 kHz to 320 slots for a subcarrier spacing of 240 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.0.0 (2017-12). However, transmission may also be non-slot based. In non slot-based communication, the minimum length of a TTI may be 2 OFDM symbols. The BWP concept in NR is to allow the dynamic configuration of a relatively small active bandwidth for smaller data packets, which allows power saving for the UE because for a small active BWP the UE needs to monitor less frequencies or use less frequencies for transmission.

The active bandwidth part for a user equipment (e.g., the bandwidth part to be used by a UE for transmission and reception of signals in a TTI), can be switched among the configured BWPs. For instance, depending on current needs, the active BWP may be switched to a larger BWP, or, in order to save battery power for the UE, to a smaller BWP. This is possible by dynamical indication in the DCI of the active BWP to be used in the next TTI. A DCI transports downlink and uplink scheduling information (e.g., resource assignments and/or grants), requests for aperiodic CQI reports, or uplink power control commands for one cell and one RNTI. DCI coding includes information element multiplexing, CRC (Cyclic Redundancy Check) attachment, channel coding, and rate matching. A DCI carries transmission parameters such as MCS, redundancy version or HARQ process number. A DCI consists of several field (e.g., bit fields/bitmaps) carrying different types of control information or control parameters. The location of a certain parameter, and the number of bits coding the respective parameter are known to the base station transmitting the DCI and the UE receiving the DCI. However, such switching of the active BWP adds to the latency because the UE needs to decode the DCI and then start hardware tuning to the new active BWP.

In the current NR discussion, a minimum scheduling gap, i.e., the minimum applicable value of K0 (or K2) for an active downlink, DL, (or uplink, UL) bandwidth part, may be indicated from the gNB to the UE in order to enable profiting from power saving.

The minimum applicable value may be directly assigned. One value from one or more preconfigured or predetermined values may be indicated explicitly or implicitly.

When selecting an entry of a DL or UL TDRA table, the indicated minimum applicable value may be applied by excluding invalid TDRA entries or to re-interpret the selected K0 (K2) values.

In a case where the minimum applicable value of K0 (K2) is indicated for an active DL (UL) BWP, the UE may not expect an entry of the TDRA table with a K0 (K2) value smaller than the indicated minimum applicable value or consider TDRA entries with a K0 (K2) value smaller than the indicated minimum applicable value being not valid.

According to current 3GPP discussions, the DCI format 0_1/1_1 will support an additional field with 1 bit to support cross-slot scheduling adapting allowing for power saving in BR. In particular, one or two values of minimum K0/K2 values for restricting a TDRA table are configured by RRC. In a case where one value is configured, the 1-bit indication in the DCI indicates whether or not the restriction of the TDRA table according to the configured minimum K0/K2 value is to be applied or not. In a case where two values are configured, the 1-bit indication indicates which one of the two configured values is to be used for TDRA table restriction.

In the UE-specific search space and any search space not associated with CORESET 0, and when a UE is configured with a UE-specific TDRA table, the valid entries are selected according to the indicated minimum K0/K2 value (i.e., the indicated scheduling gap) and used.

However, it may pose some difficulties to apply a minimum for K0/K2 in cross-slot scheduling for a common search space not associated with CORESET 0. Some possible issues are explained in the following.

In particular, in the common search space, it remains an open question whether or not a UE should apply a restriction according to the indicated minimum K0/K2 value when the UE is scheduled by UE-specific DCI or in a case where the UE-specific TDRA table is not configured.

In a trivial approach to handle said cases, UE could not restrict any entry of a TDRA table for a common search space using a configured common TDRA table. However, not applying a restriction would result in a reduction of power saving capabilities. Further, always applying a restriction according to an indicated minimum scheduling gap could lead to scheduling loss.

In order to resolve the issues, the present invention provides various embodiments described below, which facilitate determination of whether or not cross-slot adaption is applied, depending on information on certain conditions. The conditions may include whether a common TDRA table is configured, a result of a comparison between an indicated minimum scheduling gap and scheduling gaps included in a TDRA table, and/or whether an entry of a TDRA table is selected for uplink (UL) or downlink (DL) transmission of data.

Since the present disclosure relates to scheduling, both entities, a scheduled device (typically communication device/transceiver device) and scheduling device (typically network node) take part. The present invention further provides a system including a scheduled and scheduling device, as well as a corresponding methods and programs.

In the following, UEs, base stations, and procedures will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Figure 8:
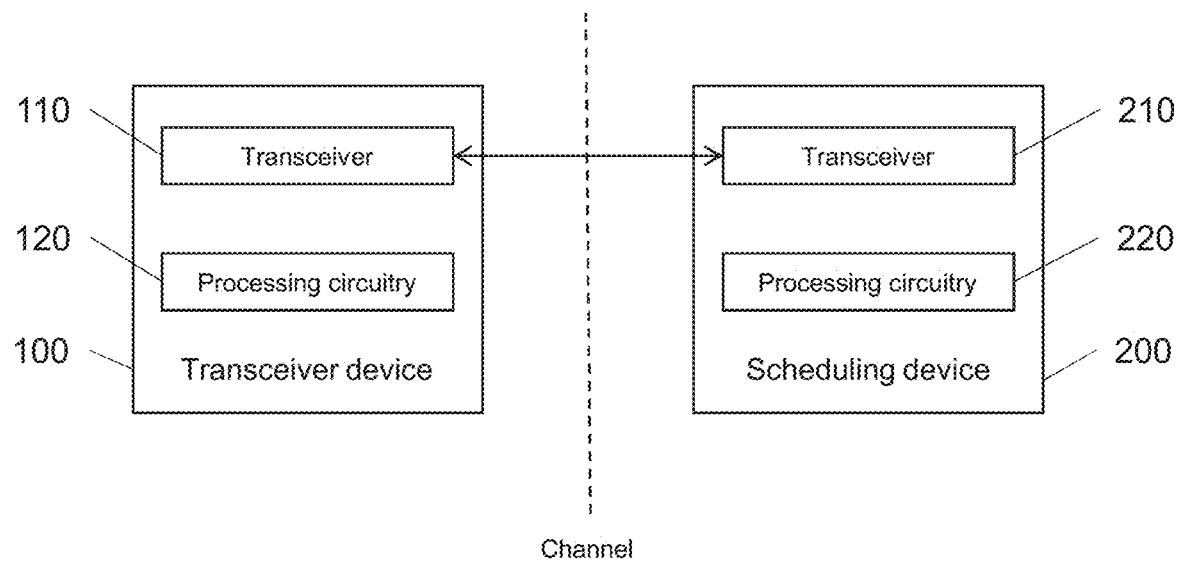
FIG. 8 is a block diagram illustrating a transceiver device and a scheduling device.

FIG. 8 illustrates a general, simplified and exemplary block diagram of a user equipment (also termed communication device or transceiver device) 100 and a scheduling device 200 (here exemplarily assumed to be located in the base station, e.g., the eLTE eNB (alternatively termed ng-eNB) or the gNB in 5G NR). The UE 100 and eNB/gNB 300 are communicating with each other over a (wireless) physical channel respectively using the transceiver 110, 210.

The communication device 100 may comprise a transceiver 110 and processing circuitry 120. The transceiver 110 in turn may comprise and/or function as a receiver and a transmitter. The processing circuitry 120 may be one or more pieces of hardware such as one or more processors or any LSIs. Between the transceiver 110 and the processing circuitry 120 there is an input/output point (or node, not shown) over which the processing circuitry 120, when in operation, can control the transceiver 110, i.e., control the receiver and/or the transmitter and exchange reception/transmission data. The transceiver 110, as the transmitter and receiver, may include the RF (radio frequency) front including one or more antennas, amplifiers, RF modulators/demodulators and the like. The processing circuitry 120 may implement control tasks such as controlling the transceiver 110 to transmit user data and control data provided by the processing circuitry 120 and/or receive user data and control data, which is further processed by the processing circuitry 120. The processing circuitry 120 may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

The scheduling device 200 may comprise a transceiver 210 and processing circuitry 220. The transceiver 210 in turn may comprise and/or function as a receiver and a transmitter. The processing circuitry 220 may be one or more pieces of hardware such as one or more processors or any LSIs. Between the transceiver 210 and the processing circuitry 220 there is an input/output point (or node, not shown) over which the processing circuitry 220, when in operation, can control the transceiver 210, i.e., control the receiver and/or the transmitter and exchange reception/transmission data. The transceiver 210, as the transmitter and receiver, may include the RF (radio frequency) front including one or more antennas, amplifiers, RF modulators/demodulators and the like. The processing circuitry 220 may implement control tasks such as controlling the transceiver 210 to transmit data and control data provided by the processing circuitry 120 and/or receive user data, which is further processed by the processing circuitry 220. The processing circuitry 220 may also be responsible for performing other processes such as determining, deciding, calculating, measuring, etc. The transmitter may be responsible for performing the process of transmitting and other processes related thereto. The receiver may be responsible for performing the process of receiving and other processes related thereto.

EMBODIMENTS

For scheduling, four scenarios are conceivable, depending on whether a UE-specific TDRA table is configured or not, and on whether a common TDRA table is configured or not.

In the following, said cases are described for downlink scheduling. However, corresponding cases are conceivable for uplink scheduling, wherein the respective TDRA tables are configured for UL scheduling.

In a case where a UE-specific TDRA table is configured, that is, pdsch-Config includes pdsch-TimeDomainAllocationList, the UE-specific TDRA table is used for DL scheduling in a user-specific search space (USS) and any common search space (CSS) not associated with CORESET 0.

In a case where the UE-specific TDRA table is not configured, the TDRA table to be used for DL scheduling in a user-specific search space (USS) and any common search space (CSS) not associated with CORESET 0 depends on whether the common TDRA table is configured or not. In a case where the common TDRA table is configured, that is, pdsch-ConfigCommon includes pdsch-TimeDomainAllocationList, the configured common TDRA table is used for DL scheduling in a user-specific search space (USS) and any common search space (CSS) not associated with CORESET 0. On the other hand, in a case where a common TDRA table is not configured, a default TDRA table (default table A) is used for DL scheduling in a user-specific search space (USS) and any common search space (CSS) not associated with CORESET 0.

In a case where the common TDRA table is configured, said common TDRA table is used for DL scheduling in the CSS associated with CORESET 0. On the other hand, if the common TDRA table is not configured the default TDRA table is used for DL scheduling.

The described cases are summarized in table 1.

TABLE 1

Use of TDRA tables in DL scheduling

| Case | UE-specific TDRA table configured | Common TDRA table configured | USS and any CSS not associated with CORESET 0 | CSS associated with CORESET 0 |
|---|---|---|---|---|
| 1.1 | Yes | Yes | UE-specific TDRA table | Common TDRA table |
| 1.2 | Yes | No | UE-specific TDRA table | Default table A |
| 2.1 | No | Yes | Common TDRA table | Common TDRA table |
| 2.2 | No | No | Default table A | Default table A |

The present disclosure provides devices and methods for determining whether or not a restriction of a TDRA table used for a CSS not associated with CORESET 0 or a TDRA table used for USS and any CSS associated with CORESET 0 other than a UE-specific TDRA table is applied according to a minimum scheduling gap.

FIG. 9 is a schematic drawing illustrating exemplary restrictions of an exemplary TDRA table according to minimum scheduling gaps. The TDRA table corresponds to the TDRA table illustrated in FIG. 6 and is described above in detail. Further, the solid line box and the dashed line box indicate valid entries of the TDRA table according to a restriction of the TDRA table according to a minimum scheduling gap of 2 and 3, respectively.

For example, in a case where a minimum scheduling gap of 2 is indicated, rows (entries) 1 to 5 are considered invalid due to their corresponding scheduling gaps being smaller than the indicated minimum scheduling gap. Further, rows (entries) 6 to 16 are determined valid, as the corresponding scheduling gaps are equal to or larger than the indicated minimum scheduling gap. This is illustrated by the solid box in FIG. 9.

As another example, in a case where a minimum scheduling gap of 3 is indicated, rows (entries) 1 to 8 are considered invalid due to their corresponding scheduling gaps being smaller than the indicated minimum scheduling gap. Further, rows (entries) 9 to 16 are determined valid, as the corresponding scheduling gaps are equal to or larger than the indicated minimum scheduling gap. This is illustrated by the dashed box in FIG. 9.

In a case where rows (entries) of a configured TDRA table are determined invalid, the UE is not required to buffer all the symbols after receiving PDCCH corresponding to invalid entries of the TDRA table. Further, the UE may save power by relaxing the PDCCH processing timeline, for instance, since a UE may not be required to decode PDCCH as fast as in the same-slot scheduling case.

In a case where a TDRA table is restricted according to a minimum scheduling gap indicated by DCI, certain entries of the TDRA table are determined invalid. In particular, entries with a scheduling gap smaller than the indicated minimum scheduling gap are invalidated. This allows the UE, for instance, to skip the PDSCH buffering at least in the current slot (e.g., the slot in which the PDCCH is received) and the next slots according to the minimum scheduling gap. Moreover, cross-slot scheduling potential may allow for micro-sleep periods in this time interval especially in a case where no PDCCH is to be monitored until the scheduled resource is received.

Note that the restriction according to the disclosure is not limited to a restriction as described with reference to FIG. 9 above. In particular, a minimum scheduling gap other than 2 or 3 may be indicated. Further, applying a restriction to a TDRA table may refer to skipping all monitoring occasions in a search space for which the TDRA table is used, for example, in the slots corresponding to the minimum scheduling gap, or to switching to another TDRA table to be used for the search space or the like. This is described in the framework of the following embodiments.

Embodiment 1—Downlink Case

In the embodiment in case of scheduling of a downlink data transmission, the transceiver device determines whether or not to apply a restriction to a TDRA table according to a minimum scheduling gap, wherein the determination includes a determination of whether or not a common TDRA table is configured.

(A) a Common TDRA is not Configured

As described above, the default table A is used in a case where a common TDRA table is not configured for a CSS associated with CORESET 0 in cases 1.2 and 2.2 indicated in table 1 as well as for the USS and any CSS not associated with CORESET 0 in case 2.2. By the standard, the default TDRA table for DL comprises only entries indicating scheduling gaps with a value of zero. Thus, applying a restriction to the default TDRA table according to a minimum scheduling gap larger than zero would result in all entries of the default TDRA table being invalidated by the UE, which might result in a loss of scheduling information.

Thus, in a case where it is determined that the common TDRA table is not configured, a restriction of the TDRA table used for CSS associated with CORESET 0, i.e., the default TDRA table, according to the minimum scheduling gap is not applied.

Further, in a case where the default TDRA table is used for scheduling in a USS and any CSS not associated with CORESET 0 (case 2.2 indicated in table 1), the restriction according to the minimum scheduling gap is not applied either.

In other words, when a common TDRA table is not configured, and the standard TDRA table is used for scheduling in the CSS associates with CORESET 0 and/or the USS and any CSS not associated with CORESET 0, a restriction to said default TDRA table according to a minimum scheduling gap is not applied.

In a variation, in a case where a default TDRA table is used for scheduling in the CSS associated with CORESET 0 (as in cases 1.2 and 2.2 of table 1) or also in the USS and any CSS not associated with CORESET 0 (as in case 2.2 of table 1), and the minimum scheduling gap indicated by a previous DCI is larger than zero, UE may not monitor occasions of a physical control channel (e.g., a physical downlink control channel, PDCCH) in the respective search space. By not monitoring said occasions, paging and system information is not monitored by the UE. With this approach, the gNB may cause the UE to skip said occasions by indicating a minimum scheduling gap larger than zero if changed system information are not indicated within said occasions.

(B) A Common TDRA is Configured

However, in a case where a common TDRA table is configured, as in cases 1.1 and 2.1 described above and indicated in table 1, a restriction of the common TDRA table, which is used for scheduling in the CSS associated with CORESET 0 in cases 1.1 and 2.1 as well as for the USS and any CSS not associated with CORESET 0 in case 2.1, could not be applied either, due to that in CSS, UE will not apply cross-slot scheduling for group common PDCCH with SI-RNTI, RA-RNTI, TC-RNTI and P-RNTI. However, when not applying a restriction to the common TDRA table, UE would use a fast PDCCH processing timeline and buffer all the PDSCH, which would result in a larger power consumption than necessary. Thus, as the UE is not required to monitor the group-common PDCCH in every possible monitoring occasion since gc-PDCCH does not appear in every slot, power saving is achievable by cross-slot scheduling adaption under certain conditions.

According to the embodiment, the UE determines whether to apply a restriction to the common TDRA table according to the minimum scheduling gap depending on a comparison of the indicated minimum scheduling gap and scheduling gaps included in the common TDRA table, which comprises a plurality of entries, each entry specifying a time domain resource allocation including a scheduling gap indicator indicating a gap between reception of the scheduling grant and scheduled resources.

In a case where the minimum scheduling gap is within the range of scheduling gaps included in the common TDRA table, the UE determines to apply the restriction to the common TDRA table according to the minimum scheduling gap by invalidating the entries of the TDRA table with a scheduling gap smaller than the indicated minimum scheduling gap.

In other words, in a case where the minimum scheduling gap is larger than or equal to the smallest scheduling gap in the common TDRA table and smaller than or equal to the largest scheduling gap in the common TDRA table, the UE determines to apply a restriction to the common TDRA table according to the minimum scheduling gap.

In a case where the minimum scheduling gap indicated by a previous DCI is larger than the largest scheduling gap included in the common TDRA table, the transceiver is controlled not to monitor the PDCCH monitoring occasions in the search space using the common TDRA table. Accordingly, in a case where the minimum gap indicated by a DCI is not larger than the largest scheduling gap included in the common TDRA, the transceiver may be controlled to monitor the PDCCH monitoring occasions in the search space using the common TDRA table. For example, the transceiver may be controlled to start monitoring said monitoring occasions again when a minimum scheduling gap indicated by DCI is equal to or smaller than the largest scheduling gap value included in the TDRA table.

Specifically, in case 1.1 indicated above, the PDCCH monitoring occasions in the CSS associated with CORESET 0 are skipped. Further, in case 2.1 indicated above, the PDCCH monitoring occasions in the CSS associated with CORESET 0 and the PDCCH monitoring occasions in the CSS associated with CORESET 0 as well as the PDCCH monitoring occasions in the USS and any CSS not associated with CORESET 0 are skipped. This approach allows for skipping paging and system information monitoring in a case where gNB determined that the monitoring of said paging and system information is not required for the UE. In other words, by indicating a minimum scheduling gap larger than the maximum scheduling gap within the common TDRA table, gNB may cause the UE not to monitor the paging and system information.

Alternatively, in a case where the minimum scheduling gap is larger than the largest scheduling gap included in the common TDRA table, the UE does not apply a restriction to the common TDRA table. Further, for example, the UE may determine a second TDRA table different from the common TDRA table and use said second TDRA table for scheduling. In other words, in a case where the minimum scheduling gap is larger than the maximum scheduling gap value included in the common TDRA table, the UE may not apply a restriction to the common TDRA table and, instead, use another TDRA table for scheduling purposes. For instance, the second TDRA table may be the default TDRA table described above. With this approach, a loss of scheduling information is prevented, as the restriction is not applied to the common TDRA table, which would result in all entries being considered invalid by the UE.

Further, alternatively, the UE may not expect to be indicated a minimum scheduling gap larger than the maximum scheduling gap included in the common TDRA table. That is, in a case where a minimum scheduling gap larger than the maximum scheduling gap included in the common TDRA is indicated by DCI, said minimum scheduling gap is disregarded when determining whether to apply a restriction to a configured common TDRA table. This approach prevents scheduling losses due to an erroneously applied restriction of the common TDRA table according to a minimum scheduling gap value, which would not cause a meaningful differentiation of TDRA table entries as valid or invalid.

In a variation, in a case where the scheduling gaps according to the entries of the common TDRA table are equal to each other, the UE determines not to apply a restriction to the common TDRA tables according to a minimum scheduling gap indicated by a previous DCI. For example, in a case where all scheduling gaps included in the common TDRA table are equal to zero, the UE does not apply a restriction according to the minimum scheduling gap. In particular, in such a case where all scheduling gaps in the common TDRA table are equal, a meaningful differentiation between valid and invalid entries using the minimum scheduling gap is not possible, as either all entries or no entry would be considered valid. The approach of the variation allows for preventing such a situation.

In a further variation, the UE may determine whether it is configured to monitor a group-common physical control channel (i.e., a group-common physical downlink control channel, gc-PDCCH) in the CSS associated with CORESET 0 and determine whether to apply the restriction to the common TDRA table according to the minimum scheduling gap depending on the result of the determination. Specifically, if the UE is not configured to monitor a gc-PDCCH in the CSS associated with CORESET 0, the restriction to the common TDRA table is applied. That is, in a case where the UE is not configured to monitor a gc-PDCCH, the restriction is applied, which allows for above-described power saving measures. Note that the UE may be configured in advance to monitor a gc-PDCCH by broadcasting, for instance.

In the embodiment and variations described above, the transceiver of the UE receives data after receiving a corresponding scheduling grant. In particular, the data is received over a PDSCH on resources indicated in the scheduling grant, wherein said resources are located within a slot, whose temporal distance to the reception of the scheduling grant is larger than the indicated minimum scheduling gap.

Embodiment 2—Uplink Case

As described above, according to current 3GPP discussion, the minimum scheduling gaps for downlink and uplink may be jointly configured by RRC signaling and indicated by DCI format 0_1 and 1_1.

Just as for downlink, in a case where a common TDRA table is not configured, a default TDRA table may be used for scheduling in the CSS associated with CORESET 0. Further, if a UE-specific TDRA table is also not configured, said default table may be used for scheduling in the USS and any CSS not associated with CORESET 0 as well.

The default uplink TDRA table, however, standardly includes entries with scheduling gaps larger than 0, in contrast to the default downlink TDRA table. Thus, not applying a restriction to the default table for uplink, as it is done for downlink, would prevent power saving achievable by cross-slot scheduling adaption. Therefore, for uplink scheduling, a restriction may be applied to the TDRA table used for scheduling in the CSS associated with CORESET 0 even in a case where a common TDRA table is not configured. Further a restriction may be applied to the TDRA table (i.e., the default UL TDRA table) used for scheduling in the USS and any CSS not associated with CORESET 0 in a case where a UE specific TDRA table is not configured either.

Instead, in the embodiment for scheduling of an uplink transmission, the transceiver device determines whether or not to apply a restriction to a time domain resource allocation, TDRA, table according to a minimum scheduling gap, wherein the TDRA table comprises a plurality of entries, each entry specifying a time domain resource allocation including a scheduling gap indicator indicating a gap between reception of the scheduling grant and scheduled resources, and the determination includes comparing the minimum scheduling gap and the scheduling gaps included in the TDRA.

In other words, in contrast to the downlink case, a determination of whether or not to apply a restriction to the TDRA table does not necessarily include a determination of whether or not a common TDRA table is configured, as a restriction of the TDRA table used for scheduling may or may not be applied in either case. Instead, it is determined whether or not to apply the restriction by comparing the indicated minimum scheduling gap indicated by DCI and the scheduling gaps included in the entries of the used TDRA table.

Specifically, the variations described above for the downlink cases 1.1 and 2.1 indicated in table 1 apply to corresponding cases for uplink scheduling.

Note that the common TDRA table for uplink scheduling may differ from the common TDRA table for downlink scheduling. Thus, when applying the procedures described above to uplink scheduling, respective common TDRA tables for uplink scheduling are utilized.

Further, the variations described above for the downlink cases 1.1 and 2.1 indicated in table 1 may also be applied to downlink cases 1.2 and 2.2, respectively.

That is, the determination of whether a restriction is applied to the common DL TDRA table may be equivalently applied for determining whether a restriction is applied to the default UL table. Specifically, the comparison of the minimum scheduling gap with the scheduling gaps included in the TDRA refers to a comparison of a minimum scheduling gap for uplink with scheduling gaps included in the default TDRA table for uplink.

In other words, the description of the determination for downlink cases 1.1 and 2.1 apply to cases 1.1 and 2.1 for uplink, wherein downlink TDRA tables are substituted by respective UL TDRA tables. Further, the description of the determination for downlink cases 1.1 and 2.1 apply to cases 1.2 and 2.2 for uplink, respectively, wherein the common DL TDRA table is substituted with the default UL TDRA table. In Detail:

According to the embodiment, the UE determines whether to apply a restriction to the default UL TDRA table according to the minimum scheduling gap depending on a comparison of the indicated minimum scheduling gap and scheduling gaps included in the default UL TDRA table, which comprises a plurality of entries, each entry specifying a time domain resource allocation including a scheduling gap indicator indicating a gap between reception of the scheduling grant and scheduled resources.

In a case where the minimum scheduling gap is within the range of scheduling gaps included in the default UL TDRA table, the UE determines to apply the restriction to the default UL TDRA table according to the minimum scheduling gap by invalidating the entries of the TDRA table with a scheduling gap smaller than the indicated minimum scheduling gap.

In other words, in a case where the minimum scheduling gap is larger than or equal to the smallest scheduling gap in the default UL TDRA table and smaller than or equal to the largest scheduling gap in the default UL TDRA table, the UE determines to apply a restriction to the default UL TDRA table according to the minimum scheduling gap.

In a case where the minimum scheduling gap indicated by a previous DCI is larger than the largest scheduling gap included in the default UL TDRA table, the transceiver is controlled not to monitor the PDCCH monitoring occasions in the search space using the default UL TDRA table. Accordingly, in a case where the minimum gap indicated by a DCI is not larger than the largest scheduling gap included in the default UL TDRA, the transceiver may be controlled to monitor the PDCCH monitoring occasions in the search space using the default UL TDRA table. For example, the transceiver may be controlled to start monitoring said monitoring occasions again when a minimum scheduling gap indicated by DCI is equal to or smaller than the largest scheduling gap value included in the TDRA table.

Specifically, corresponding to case 1.1 indicated above, the PDCCH monitoring occasions in the CSS associated with CORESET 0 are skipped. Further, corresponding to case 2.1 indicated above, the PDCCH monitoring occasions in the CSS associated with CORESET 0 and the PDCCH monitoring occasions in the CSS associated with CORESET 0 as well as the PDCCH monitoring occasions in the USS and any CSS not associated with CORESET 0 are skipped. This approach allows for skipping paging and system information monitoring in a case where gNB determined that the monitoring of said paging and system information is not required for the UE. In other words, by indicating a minimum scheduling gap larger than the maximum scheduling gap within the default UL TDRA table, gNB may cause the UE not to monitor the paging and system information.

Alternatively, in a case where the minimum scheduling gap is larger than the largest scheduling gap included in the default UL TDRA table, the UE does not apply a restriction to the default UL TDRA table. With this approach, a loss of scheduling information is prevented, as the restriction is not applied to the common TDRA table, which would result in all entries being considered invalid by the UE.

Further, alternatively, the UE may not expect to be indicated a minimum scheduling gap larger than the maximum scheduling gap included in the default UL TDRA table. That is, in a case where a minimum scheduling gap larger than the maximum scheduling gap included in the default UL TDRA is indicated by DCI, said minimum scheduling gap is disregarded when determining whether to apply a restriction to a configured default UL TDRA table. This approach prevents scheduling losses due to an erroneously applied restriction of the default UL TDRA table according to a minimum scheduling gap value, which would not cause a meaningful differentiation of TDRA table entries as valid or invalid.

In a variation, in a case where the scheduling gaps according to the entries of the default UL TDRA table are equal to each other, the UE determines not to apply a restriction to the default UL TDRA tables according to a minimum scheduling gap indicated by a previous DCI. In particular, in such a case where all scheduling gaps in the default UL TDRA table are equal, a meaningful differentiation between valid and invalid entries using the minimum scheduling gap is not possible, as either all entries or no entry would be considered valid. The approach of the variation allows for preventing such a situation.

In a further variation, the UE may determine whether it is configured to monitor a group-common physical control channel (i.e., a group-common physical downlink control channel, gc-PDCCH) in the CSS associated with CORESET 0 and determine whether to apply the restriction to the default UL TDRA table according to the minimum scheduling gap depending on the result of the determination. Specifically, if the UE is not configured to monitor a gc-PDCCH in the CSS associated with CORESET 0, the restriction to the default UL TDRA table is applied. That is, in a case where the UE is not configured to monitor a gc-PDCCH, the restriction is applied, which allows for above-described power saving measures. Note that the UE may be configured in advance to monitor a gc-PDCCH by broadcasting, for instance.

In the embodiment and variations described above, the transceiver of the UE transmits data after receiving a corresponding scheduling grant. In particular, the data is transmitted over a PUSCH on resources indicated in the scheduling grant, wherein said resources are located within a slot, whose temporal distance to the reception of the scheduling grant is larger than the indicated minimum scheduling gap Hardware and Software Implementation of the Present Disclosure The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

Further Aspects

As described above, provided are devices and methods for facilitating to save UE power, including procedures involving cross-slot scheduling. In particular, provided are devices and methods for determining whether or not to apply a restriction to a time domain resource allocation table, TDRA, using information on particular conditions. Said conditions may include at information on whether or not a common TDRA table is configured, a result of a comparison between an indicated minimum scheduling gap and scheduling gaps in a TDRA table and/or whether resources are scheduled for an uplink or a downlink transmission of data. Aspects of the present disclosure are summarized in the following.

According to a first aspect, a transceiver device is provided, comprising a transceiver, which in operation, receives data after receiving a scheduling grant; and circuitry, which in operation, determines whether or not to apply a restriction to a time domain resource allocation, TDRA, table according to a minimum scheduling gap, wherein the determination includes a determination of whether or not a common TDRA table is configured.

For example, the TDRA table to which the restriction may be applied according to a result of the determination may be the common TDRA table itself, if it is configured, or a TDRA table different from the common TDRA table and different from a TDRA table specific to the transceiver device.

For instance, the TDRA table may be a TDRA table used for downlink scheduling in a common search space associated with CORESET 0. Further, for example, the TDRA table may be a TDRA table used for downlink scheduling in a common search space associated with CORESET 0 and for a user-specific search space and any common search space not associated with CORESET 0.

For instance, the TDRA table may be a common TDRA table or a default TDRA table.

For example, the TDRA table may be a TDRA table not being configured as specific to the transceiver device.

For instance, the TDRA table is a TDRA table used for scheduling resources for reception of data.

For instance, the transceiver, in operation, receives the data according to resources indicated by the scheduling grant.

For instance, the scheduling grant indicates scheduled resources for reception of data, wherein the resources are scheduled after a scheduling gap larger than or equal to the minimum scheduling gap after reception of the scheduling grant.

The determination whether to apply a restriction to a TDRA table according to a minimum scheduling gap allows, under certain conditions, the transceiver device not to buffer symbols after reception of the scheduling grant, which allows for power saving, for instance.

In an embodiment, the circuitry, in operation, determines not to apply the restriction to the TDRA table in a case where it is determined that the common TDRA table is not configured.

In other words, for instance, in a case where a common TDRA table is configured and used for downlink scheduling, the circuitry may determine to apply the restriction to said common TDRA table. Further, in a case where a common TDRA table is not configured and another TDRA table is used for downlink scheduling, the restriction may not be applied.

For example, in a case where the other TDRA table is not the common TDRA table and not a TDRA table configured specifically for the transceiver device, the circuitry may determine not to apply the restriction.

As under the defined condition, i.e., a common TDRA table not being configured, the restriction is not applied, possible scheduling loss is prevented.

In an embodiment, the circuitry, in operation, controls the transceiver not to monitor occasions of a physical control channel in a search space associated with the TDRA table, in a case where the minimum scheduling gap is larger than zero.

For example, the circuitry, in operation, controls the transceiver not to monitor occasions of the physical control channel in a case where the minimum scheduling gap is larger than zero and a common TDRA table is not configured.

Further, for example, the circuitry, in operation, controls the transceiver not to monitor occasions of the physical control channel in a case where the minimum scheduling gap is larger than zero, a common TDRA table is not configured and a default TDRA table is used for scheduling.

For instance, the physical control channel may be a physical downlink control channel, PDCCH.

In an embodiment, the TDRA table comprises a plurality of entries, each entry specifying a time domain resource allocation including a scheduling gap indicator indicating a gap between reception of the scheduling grant and scheduled resources, and the determination further includes comparing the minimum scheduling gap and the scheduling gaps included in the TDRA table, in a case where it is determined that the common TDRA table is configured.

In other words, the determination whether or not to apply a restriction to the TDRA table may include a determination of whether or not a common TDRA table is configured and a comparison of the minimum scheduling gap and scheduling gap values included in the TDRA table.

For example, in a case where it is determined that a common TDRA table is not configured, the circuitry may perform a comparison of the minimum scheduling gap with the scheduling gaps included in the common TDRA table and determine whether to apply a restriction to the common TDRA table using the result of the comparison.

In an embodiment, the circuitry, in operation, determines to apply the restriction to the TDRA table, in a case where the minimum scheduling gap is within the range of scheduling gaps included in the TDRA table.

For example, the circuitry, in operation, determines that the minimum scheduling gap is within the range of the scheduling gaps in the TDRA table if the minimum scheduling gap is larger or equal to the smallest scheduling gap included in the TDRA table and smaller than or equal to the largest scheduling gap included in the TDRA table.

In an embodiment, the circuitry, in operation, controls the transceiver not to monitor occasions of a physical control channel in a search space associated with the TDRA table, in a case where the minimum scheduling gap is larger than the largest scheduling gap included in the TDRA table.

For example, the physical control channel may be a physical downlink control channel, PDCCH.

In an embodiment, the circuitry, in operation, determines not to apply the restriction to the TDRA table, in a case where the minimum scheduling gap is larger than the largest scheduling gap included in the TDRA table.

In an embodiment, the circuitry, in operation, further determines a second TDRA table different from the TDRA table for resource allocation and uses said second TDRA table for scheduling, in a case where the minimum scheduling gap is larger than the largest scheduling gap included in the TDRA table.

In other words, in a case where the minimum scheduling gap is larger than the largest scheduling gap included in the TDRA table, the circuitry, in operation, determines and utilizes a second TDRA table different to the TDRA table for scheduling of resources. The restriction is not applied to the second TDRA table.

For example, the second TDRA table is a default TDRA table.

In an embodiment, the circuitry, in operation, determines not to apply the restriction to the TDRA table, in a case where the scheduling gaps included in the TDRA table are equal to each other.

In other words, in a case where the TDRA table includes only scheduling gap values, which are all equal to each other, the restriction is not applied to the TDRA table.

In an embodiment, the determination includes determining whether the transceiver device is configured to monitor a group-common physical control channel; and the circuitry, in operation, determines to apply the restriction to the TDRA table, in a case where the transceiver device is not configured to monitor the group-common physical control channel.

In an embodiment, the transceiver, in operation, receives a minimum scheduling gap indicator indicating the minimum scheduling gap.

For example, the transceiver receives the minimum scheduling gap indicator by downlink control information, DCI, signalling.

For example, one or more minimum scheduling gap values are configured by Radio Resource Control, RRC, signalling.

In an embodiment, the minimum scheduling gap indicates a minimum value of a gap between reception of the scheduling grant and scheduled resources in terms of time slots.

In other words, the minimum scheduling gap represents a minimum temporal period between reception of a scheduling grant and resources scheduled for data reception indicated by said scheduling grant. The temporal period is indicated in terms of time slots, whose duration may be, for instance, be set or configured previously.

According to a second aspect, a transceiver device is provided, comprising a transceiver, which in operation, transmits data after receiving a scheduling grant; and circuitry, which in operation, determines whether or not to apply a restriction to a time domain resource allocation, TDRA, table according to a minimum scheduling gap, wherein the TDRA table comprises a plurality of entries, each entry specifying a time domain resource allocation including a scheduling gap indicator indicating a gap between reception of the scheduling grant and scheduled resources, and the determination includes comparing the minimum scheduling gap and the scheduling gaps included in the TDRA table.

For example, the TDRA table to which the restriction may be applied according to a result of the determination may be the common TDRA table itself, if it is configured, or a TDRA table different from the common TDRA table and different from a TDRA table specific to a transceiver device.

For instance, the TDRA table may be a TDRA table used for uplink scheduling in a common search space associated with CORESET 0. Further, for example, the TDRA table may be a TDRA table used for uplink scheduling in a common search space associated with CORESET 0 and for a user-specific search space and any common search space not associated with CORESET 0.

For instance, the TDRA table may be a common TDRA table or a default TDRA table.

For example, the TDRA table may be a TDRA table not being configured as specific to a transceiver device.

For instance, the TDRA table is a TDRA table used for scheduling resources for transmission of data.

For instance, the transceiver, in operation, transmits the data according to resources indicated by the scheduling grant.

For instance, the scheduling grant indicates scheduled resources for transmission of data, wherein the resources are scheduled after a scheduling gap larger than or equal to the minimum scheduling gap after reception of the scheduling grant.

The determination whether to apply a restriction to a TDRA table according to a minimum scheduling gap allows, under certain conditions, the transceiver device not to buffer symbols after reception of the scheduling grant, which allows for power saving, for instance.

In an embodiment, the circuitry, in operation, determines to apply the restriction to the TDRA table, in a case where the minimum scheduling gap is within the range of scheduling gaps included in the TDRA table.

For example, the circuitry, in operation, determines that the minimum scheduling gap is within the range of the scheduling gaps in the TDRA table if the minimum scheduling gap is larger or equal to the smallest scheduling gap included in the TDRA table and smaller than or equal to the largest scheduling gap included in the TDRA table.

In an embodiment, the circuitry, in operation, controls the transceiver not to monitor occasions of a physical control channel in a search space associated with the TDRA table, in a case where the minimum scheduling gap is larger than the largest scheduling gap included in the TDRA table.

For example, the physical control channel may be a physical uplink control channel, PUCCH.

In an embodiment, the circuitry, in operation, determines not to apply the restriction to the TDRA table, in a case where the minimum scheduling gap is larger than the largest scheduling gap included in the TDRA table.

In an embodiment, the circuitry, in operation, further determines a second TDRA table different from the TDRA table for resource allocation and uses said second TDRA table for scheduling, in a case where the minimum scheduling gap is larger than the largest scheduling gap included in the TDRA table.

In other words, in a case where the minimum scheduling gap is larger than the largest scheduling gap included in the TDRA table, the circuitry, in operation, determines and utilizes a second TDRA table different to the TDRA table for scheduling of resources. The restriction is not applied to the second TDRA table.

For example, the second TDRA table is a default TDRA table.

In an embodiment, the circuitry, in operation, determines not to apply the restriction to the TDRA table, in a case where the scheduling gaps included in the TDRA table are equal to each other.

In other words, in a case where the TDRA table includes only scheduling gap values, which are all equal to each other, the restriction is not applied to the TDRA table.

In an embodiment, the determination includes determining whether the transceiver device is configured to monitor a group-common physical control channel; and the circuitry, in operation, determines to apply the restriction to the TDRA table, in a case where the transceiver device is not configured to monitor the group-common physical control channel.

In an embodiment, the transceiver, in operation, receives a minimum scheduling gap indicator indicating the minimum scheduling gap.

For example, the transceiver receives the minimum scheduling gap indicator by downlink control information, DCI, signalling.

For example, one or more minimum scheduling gap values are configured by Radio Resource Control, RRC, signalling.

In an embodiment, the minimum scheduling gap indicates a minimum value of a gap between reception of the scheduling grant and scheduled resources in terms of time slots.

In other words, the minimum scheduling gap represents a minimum temporal period between reception of a scheduling grant and resources scheduled for data transmission indicated by said scheduling grant. The temporal period is indicated in terms of time slots, whose duration may be, for instance, be set or configured previously.

According to a third aspect, a method for receiving data is provided, the method comprising determining whether or not to apply a restriction to a time domain resource allocation, TDRA, table according to a minimum scheduling gap, wherein the determination includes a determination of whether or not a common TDRA table is configured; and receiving data after receiving a scheduling grant.

For example, the TDRA table to which the restriction may be applied according to a result of the determination may be the common TDRA table itself, if it is configured, or a TDRA table different from the common TDRA table and different from a TDRA table specific to the transceiver device.

For instance, the TDRA table may be a TDRA table used for downlink scheduling in a common search space associated with CORESET 0. Further, for example, the TDRA table may be a TDRA table used for downlink scheduling in a common search space associated with CORESET 0 and for a user-specific search space and any common search space not associated with CORESET 0.

For instance, the TDRA table may be a common TDRA table or a default TDRA table.

For example, the TDRA table may be a TDRA table not being configured as specific to a transceiver device.

For instance, the TDRA table is a TDRA table used for scheduling resources for reception of data.

For instance, the data is received according to resources indicated by the scheduling grant.

For instance, the scheduling grant indicates scheduled resources for reception of data, wherein the resources are scheduled after a scheduling gap larger than or equal to the minimum scheduling gap after reception of the scheduling grant.

The determination whether to apply a restriction to a TDRA table according to a minimum scheduling gap allows, under certain conditions, the transceiver device not to buffer symbols after reception of the scheduling grant, which allows for power saving, for instance.

In an embodiment, it is determined not to apply the restriction to the TDRA table in a case where it is determined that the common TDRA table is not configured.

In other words, for instance, in a case where a common TDRA table is configured and used for downlink scheduling, it may be determined to apply the restriction to said common TDRA table. Further, in a case where a common TDRA table is not configured and another TDRA table is used for downlink scheduling, the restriction may not be applied.

For example, in a case where the other TDRA table is not the common TDRA table and not a TDRA table configured specifically for a transceiver device, tit may be determined not to apply the restriction.

As under the defined condition, i.e., a common TDRA table not being configured, the restriction is not applied, possible scheduling loss is prevented.

In an embodiment, occasions of a physical control channel in a search space associated with the TDRA table are not monitored, in a case where the minimum scheduling gap is larger than zero.

For example, occasions of the physical control channel are not monitored in a case where the minimum scheduling gap is larger than zero and a common TDRA table is not configured.

Further, for example, occasions of the physical control channel are not monitored in a case where the minimum scheduling gap is larger than zero, a common TDRA table is not configured and a default TDRA table is used for scheduling.

For instance, the physical control channel may be a physical downlink control channel, PDCCH.

In an embodiment, the TDRA table comprises a plurality of entries, each entry specifying a time domain resource allocation including a scheduling gap indicator indicating a gap between reception of the scheduling grant and scheduled resources, and the determination further includes comparing the minimum scheduling gap and the scheduling gaps included in the TDRA table, in a case where it is determined that the common TDRA table is configured.

In other words, the determination whether or not to apply a restriction to the TDRA table may include a determination of whether or not a common TDRA table is configured and a comparison of the minimum scheduling gap and scheduling gap values included in the TDRA table.

For example, in a case where it is determined that a common TDRA table is not configured, a comparison of the minimum scheduling gap with the scheduling gaps included in the common TDRA table is performed and it is determined whether to apply a restriction to the common TDRA table using the result of the comparison.

In an embodiment, it is determined to apply the restriction to the TDRA table, in a case where the minimum scheduling gap is within the range of scheduling gaps included in the TDRA table.

For example, it is determined that the minimum scheduling gap is within the range of the scheduling gaps in the TDRA table if the minimum scheduling gap is larger or equal to the smallest scheduling gap included in the TDRA table and smaller than or equal to the largest scheduling gap included in the TDRA table.

In an embodiment, occasions of a physical control channel in a search space associated with the TDRA table are not monitored, in a case where the minimum scheduling gap is larger than the largest scheduling gap included in the TDRA table.

For example, the physical control channel may be a physical downlink control channel, PDCCH.

In an embodiment, it is determined not to apply the restriction to the TDRA table, in a case where the minimum scheduling gap is larger than the largest scheduling gap included in the TDRA table.

In an embodiment, the method further comprises determining a second TDRA table different from the TDRA table for resource allocation, in a case where the minimum scheduling gap is larger than the largest scheduling gap included in the TDRA table.

In other words, in a case where the minimum scheduling gap is larger than the largest scheduling gap included in the TDRA table, a second TDRA table different to the TDRA table is determined and used for scheduling of resources. The restriction is not applied to the second TDRA table.

For example, the second TDRA table is a default TDRA table.

In an embodiment, it is determined not to apply the restriction to the TDRA table, in a case where the scheduling gaps included in the TDRA table are equal to each other.

In other words, in a case where the TDRA table includes only scheduling gap values, which are all equal to each other, the restriction is not applied to the TDRA table.

In an embodiment, the determination includes determining whether monitoring a group-common physical control channel is configured; and it is determined to apply the restriction to the TDRA table, in a case where monitoring the group-common physical control channel is not configured.

In an embodiment, the method further comprises receiving a minimum scheduling gap indicator indicating the minimum scheduling gap.

For example, the minimum scheduling gap indicator is received by downlink control information, DCI, signalling.

For example, one or more minimum scheduling gap values are configured by Radio Resource Control, RRC, signalling.

In an embodiment, the minimum scheduling gap indicates a minimum value of a gap between reception of the scheduling grant and scheduled resources in terms of time slots.

In other words, the minimum scheduling gap represents a minimum temporal period between reception of a scheduling grant and resources scheduled for data reception indicated by said scheduling grant. The temporal period is indicated in terms of time slots, whose duration may be, for instance, be set or configured previously.

According to a fourth aspect, a method for transmitting data is provided, the method comprising determining whether or not to apply a restriction to a time domain resource allocation, TDRA, table according to a minimum scheduling gap, wherein the TDRA table comprises a plurality of entries, each entry specifying a time domain resource allocation including a scheduling gap indicator indicating a gap between reception of a scheduling grant and scheduled resources, and the determination includes comparing the minimum scheduling gap and the scheduling gaps included in the TDRA table; and transmitting data after receiving the scheduling grant.

For example, the TDRA table to which the restriction may be applied according to a result of the determination may be the common TDRA table itself, if it is configured, or a TDRA table different from the common TDRA table and different from a TDRA table specific to a transceiver device.

For instance, the TDRA table may be a TDRA table used for uplink scheduling in a common search space associated with CORESET 0. Further, for example, the TDRA table may be a TDRA table used for uplink scheduling in a common search space associated with CORESET 0 and for a user-specific search space and any common search space not associated with CORESET 0.

For instance, the TDRA table may be a common TDRA table or a default TDRA table.

For example, the TDRA table may be a TDRA table not being configured as specific to a transceiver device.

For instance, the TDRA table is a TDRA table used for scheduling resources for transmission of data.

For instance, the data is transmitted according to resources indicated by the scheduling grant.

For instance, the scheduling grant indicated scheduled resources for transmission of data, wherein the resources are scheduled after a scheduling gap larger than or equal to the minimum scheduling gap after reception of the scheduling grant.

The determination whether to apply a restriction to a TDRA table according to a minimum scheduling gap allows, under certain conditions, the transceiver device not to buffer symbols after reception of the scheduling grant, which allows for power saving, for instance.

In an embodiment, it is determined to apply the restriction to the TDRA table, in a case where the minimum scheduling gap is within the range of scheduling gaps included in the TDRA table.

For example, it is determined that the minimum scheduling gap is within the range of the scheduling gaps in the TDRA table if the minimum scheduling gap is larger or equal to the smallest scheduling gap included in the TDRA table and smaller than or equal to the largest scheduling gap included in the TDRA table.

In an embodiment, occasions of a physical control channel in a search space associated with the TDRA table are not monitored, in a case where the minimum scheduling gap is larger than the largest scheduling gap included in the TDRA table.

For example, the physical control channel may be a physical uplink control channel, PUCCH.

In an embodiment, it is determined not to apply the restriction to the TDRA table, in a case where the minimum scheduling gap is larger than the largest scheduling gap included in the TDRA table.

In an embodiment, the method further comprises determining a second TDRA table different from the TDRA table for resource allocation, in a case where the minimum scheduling gap is larger than the largest scheduling gap included in the TDRA table.

In other words, in a case where the minimum scheduling gap is larger than the largest scheduling gap included in the TDRA table, a second TDRA table different to the TDRA table is determined and utilized for scheduling of resources. The restriction is not applied to the second TDRA table.

For example, the second TDRA table is a default TDRA table.

In an embodiment, it is determined not to apply the restriction to the TDRA table, in a case where the scheduling gaps included in the TDRA table are equal to each other.

In other words, in a case where the TDRA table includes only scheduling gap values, which are all equal to each other, the restriction is not applied to the TDRA table.

In an embodiment, the determination includes determining whether monitoring a group-common physical control channel is configured; and it is determined to apply the restriction to the TDRA table, in a case where monitoring the group-common physical control channel is not configured.

In an embodiment, the method further comprises receiving a minimum scheduling gap indicator indicating the minimum scheduling gap.

For example, the minimum scheduling gap indicator is received by downlink control information, DCI, signalling.

For example, one or more minimum scheduling gap values are configured by Radio Resource Control, RRC, signalling.

In an embodiment, the minimum scheduling gap indicates a minimum value of a gap between reception of the scheduling grant and scheduled resources in terms of time slots.

In other words, the minimum scheduling gap represents a minimum temporal period between reception of a scheduling grant and resources scheduled for data transmission indicated by said scheduling grant. The temporal period is indicated in terms of time slots, whose duration may be, for instance, be set or configured previously.

According to a fifth aspect, a scheduling device is provided, comprising circuitry, which in operation, determines a minimum scheduling gap indicating a minimum value of a gap between transmission of a scheduling grant and scheduled resources; and a transceiver, which in operation, transmits a scheduling grant to a transceiver device, the scheduling grant indicating scheduled resources for a transmission of data, wherein the resources are scheduled after a scheduling gap larger than or equal to the minimum scheduling gap after transmission of the scheduling grant, and transmits data to or receives data from the transceiver device on the scheduled resources.

In an embodiment, the transceiver, in operation, transmits a minimum scheduling gap indicator indicating the minimum scheduling gap to the transceiver device.

For example, the circuitry, in operation, does not schedule resources for a transmission to or reception from the transceiver device in a time period after transmission of the scheduling grant, wherein said time period has a duration according to the minimum scheduling gap.

For example, the minimum scheduling gap indicator is indicated to the transceiver device by downlink control information, DCI.

In an embodiment, the circuitry, in operation, determines the minimum scheduling gap to be larger than a largest scheduling gap included in a configured time domain resource allocation, TDRA, table, which comprises a plurality of entries, each entry specifying a time domain resource allocation including a scheduling gap indicator indicating a gap between reception of the scheduling grant and scheduled resources.

With this determination, the scheduling device may cause the transceiver device to skip monitoring occasions of a physical control channel.

In an embodiment, the minimum scheduling gap indicates a minimum value of a gap between reception of the scheduling grant and scheduled resources in terms of time slots.

The invention claimed is:

1. A transceiver device, comprising:
a transceiver, which in operation, receives downlink data after receiving a scheduling information; and
circuitry, which in operation,
determines to apply a restriction to a time domain resource allocation (TDRA) table according to a minimum scheduling gap indicated in the scheduling information,
and
determines not to apply the restriction to the TDRA table in a case where it is determined that a common TDRA table is not configured and a default TDRA table is used as the TDRA table.

2. The transceiver device according to claim 1, wherein the circuitry, in operation, controls the transceiver not to monitor occasions of a physical control channel in a search space associated with the TDRA table, in a case where the minimum scheduling gap is larger than zero.

3. The transceiver device according to claim 1, wherein the TDRA table comprises a plurality of entries, each entry specifying a time domain resource allocation including a scheduling gap indicator indicating a gap between reception of the scheduling information and scheduled resources, and
the circuitry, in operation, compares the minimum scheduling gap and the scheduling gaps included in the TDRA table, in a case where it is determined that the common TDRA table is configured.

4. A transceiver device, comprising:
a transceiver, which in operation, transmits uplink data after receiving a scheduling information; and
circuitry, which in operation,
determines to apply a restriction to a time domain resource allocation (TDRA) table according to: i) a minimum scheduling gap indicated in the scheduling information, wherein
the TDRA table comprises a plurality of entries, each entry specifying a time domain resource allocation including a scheduling gap indicator indicating a gap between reception of the scheduling information and scheduled resources, and
ii) a comparison between the minimum scheduling gap and the scheduling gaps included in the TDRA table; and
determines not to apply the restriction to the TDRA table in a case where it is determined that a common TDRA table is not configured and a default TDRA table is used as the TDRA table.

5. The transceiver device according to claim 4, wherein the circuitry, in operation, determines to apply the restriction to the TDRA table, in a case where the minimum scheduling gap is within a range of the scheduling gaps included in the TDRA table.

6. The transceiver device according to claim 4, wherein the circuitry, in operation, controls the transceiver not to monitor occasions of a physical control channel in a search space associated with the TDRA table, in a case where the minimum scheduling gap is larger than the largest scheduling gap included in the TDRA table.

7. The transceiver device according to claim 4, wherein the circuitry, in operation, determines not to apply the restriction to the TDRA table, in a case where the minimum scheduling gap is larger than the largest scheduling gap included in the TDRA table.

8. The transceiver device according to claim 7, wherein the circuitry, in operation, further determines a second TDRA table different from the TDRA table for resource allocation and uses said second TDRA table for scheduling, in a case where the minimum scheduling gap is larger than the largest scheduling gap included in the TDRA table.

9. The transceiver device according to claim 4, wherein the circuitry, in operation, determines not to apply the restriction to the TDRA table, in a case where the scheduling gaps included in the TDRA table are equal to each other.

10. The transceiver device according to claim 4, wherein the circuitry, in operation, determines whether the transceiver device is configured to monitor a group-common physical control channel; and
the circuitry, in operation, determines to apply the restriction to the TDRA table, in a case where the transceiver device is not configured to monitor the group-common physical control channel.

11. The transceiver device according to claim 4, wherein the transceiver, in operation, receives a minimum scheduling gap indicator indicating the minimum scheduling gap.

12. The transceiver device according to claim 4, wherein the minimum scheduling gap indicates a minimum value of a gap between reception of the scheduling information and scheduled resources in terms of time slots.

13. The transceiver device according to claim 1, wherein when the restriction is applied to the TDRA table, the transceiver device is not expected to monitor the downlink data during a scheduling gap smaller than the minimum scheduling gap after receiving the scheduling information.

14. The transceiver device according to claim 1, wherein when the restriction is applied to the TDRA table, the transceiver device is not expected to transmit the uplink data during a scheduling gap smaller than the minimum scheduling gap after receiving the scheduling information.

15. A method comprising:
receiving a scheduling information;
determining to apply a restriction to a time domain resource allocation (TDRA) table according to a minimum scheduling gap indicated in the scheduling information;
determining not to apply the restriction to the TDRA table in a case where it is determined that a common TDRA table is not configured and a default TDRA table is used as the TDRA table; and
receiving downlink data after receiving the scheduling information.

16. The method according to claim 15, comprising:
when the restriction is applied to the TDRA table, not monitoring the downlink data during a scheduling gap smaller than the minimum scheduling gap after receiving the scheduling information.

17. A method comprising:
receiving a scheduling information;
determining to apply a restriction to a time domain resource allocation (TDRA) table according to: i) a minimum scheduling gap indicated in the scheduling information, wherein
the TDRA table comprises a plurality of entries, each entry specifying a time domain resource allocation including a scheduling gap indicator indicating a gap between reception of the scheduling information and scheduled resources, and
ii) a comparison between the minimum scheduling gap and the scheduling gaps included in the TDRA table;
determining not to apply the restriction to the TDRA table in a case where it is determined that a common TDRA table is not configured and a default TDRA table is used as the TDRA table; and
transmitting uplink data after receiving the scheduling information.

18. The method according to claim 17, comprising:
when the restriction is applied to the TDRA table, not transmitting the uplink data during a scheduling gap smaller than the minimum scheduling gap after receiving the scheduling information.

* * * * *